Nov. 27, 1951  E. R. ROSS  2,576,538
INTERNALLY EXPANDING BRAKE
Filed Dec. 6, 1948  2 SHEETS—SHEET 2
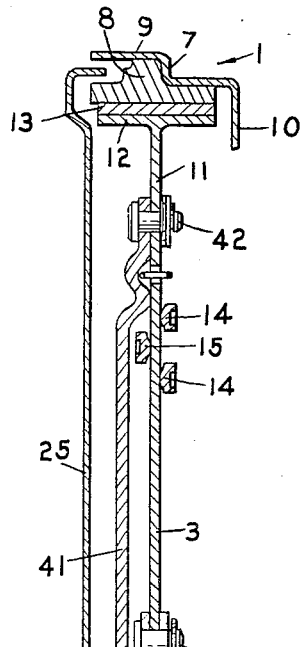
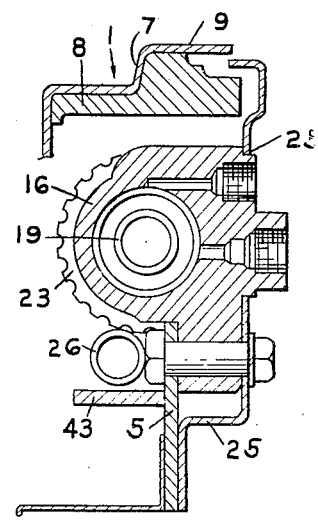
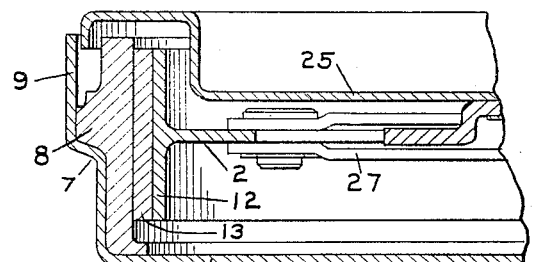
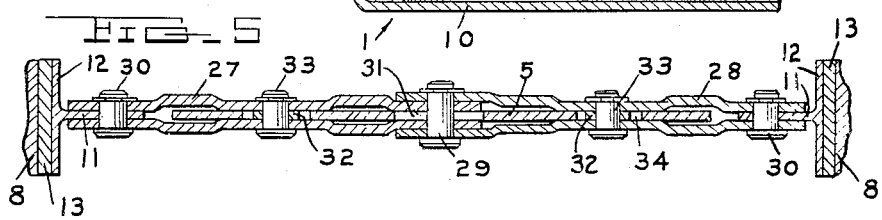
INVENTOR.
ELMER R. ROSS Patented Nov. 27, 1951

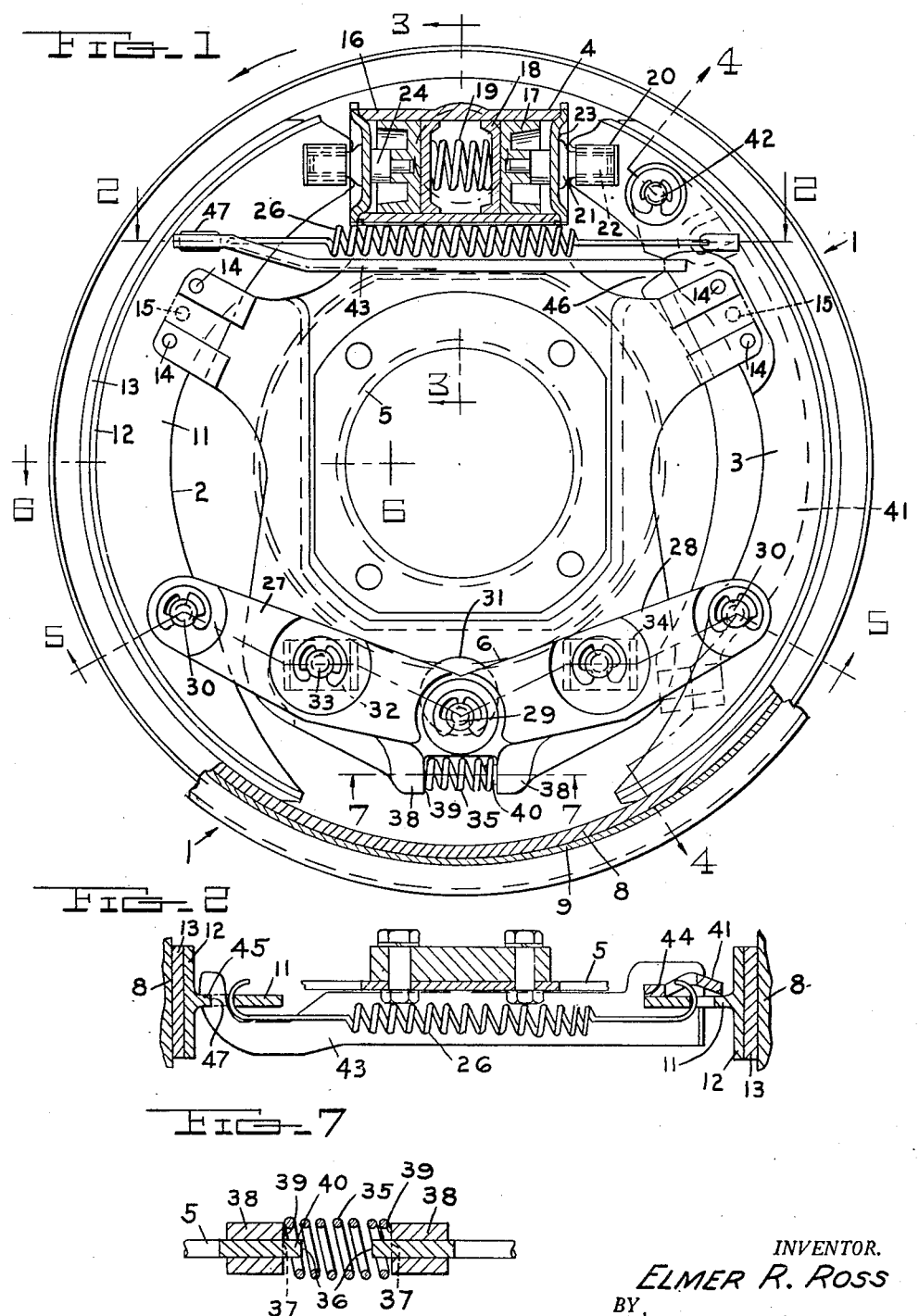

2,576,538

UNITED STATES PATENT OFFICE 2,576,538

INTERNALLY EXPANDING BRAKE

Elmer R. Ross, Detroit, Mich., assignor to Kelsey-Hayes Wheel Company, Detroit, Mich., a corporation of Delaware Application December 6, 1948, Serial No. 63,789

6 Claims. (Cl. 188—78)

1

The invention relates to brakes and refers more particularly to brakes of that type having levers operatively connected to each other and to a pair of brake shoes, the levers being responsive to engagement of one of the shoes with the brake drum by the actuator during rotation of the drum for moving the other of the shoes into engagement with the drum.

The invention has for one of its objects to provide an improved brake which is efficient in operation and produces in operation but very small lateral deflections of the drum back, substantially balanced drum expansion and substantially uniform brake lining wear at the mouth or axially outer end of the brake flange and adjacent the drum back or axially inner end of the brake flange.

The invention has for another object to provide a brake with means for guiding the intermediate portions of the levers in substantially the same plane upon energization of the actuator.

The invention has for a further object to provide a brake with means for retracting the levers and normally predeterminedly positioning the levers with respect to the drum.

With these and other objects in view, the invention resides in the novel features of construction, and combinations and arrangements of parts as more fully hereinafter set forth.

In the drawings:

Figure 1 is a side elevation partly broken away of a brake embodying the invention;

Figures 2, 3, 4, 5, 6, and 7 are cross sections on the lines 2—2, 3—3, 4—4, 5—5, 6—6, and 7—7 of Figure 1.

The brake comprises the brake drum 1, the internal friction members 2 and 3 engageable with the drum, the actuator 4 for moving the friction members into engagement with the drum to apply the brake, the anchor plate 5 and the linkage 6 at the side of the drum axis opposite the actuator for also moving the friction members into engagement with the drum.

The brake drum 1 as shown is formed of the shell 7 and the annular cast brake ring 8 which is preferably centrifugally cast into and fused with the annular brake flange 9 of the shell. The brake flange is integral with the back 10 which is secured to the member to be braked, such as a motor vehicle wheel. The friction members 2 and 3 are brake shoes of T-shaped cross section, each being like the other and having the web 11 and the arcuate platform 12 to which the brake lining 13 is secured. Each web extends between and is guided by the projections 14 and 15 on the anchorplate 5.

The actuator 4 as shown is a wheel cylinder mounted on the anchorplate 5 and extending between the upper ends of the shoes 2 and 3. The wheel cylinder comprises the cylinder 16 fixedly

2 secured to the anchorplate, the pistons 17 reciprocable within the cylinder, the sealing cups 18 and the coil spring 19 between and abutting the sealing cups. The pistons are operatively connected to the adjacent ends of the shoes by means of adjustable devices, each of which is formed of the nut 20 and the threaded member 21. The nut is sleeved into a slot in the web of the associated shoe and is provided with diametrically opposite upper and lower slots for receiving the edge portions of the web bordering the slot in the web. The threaded member comprises a screw threadedly engaging the nut 22 and the disk 23 fixedly secured to the screw as by being welded to its head. The disk in the retracted position of the associated shoe abuts the open end of the cylinder 16 and has a central cupped portion extending within the open end of the cylinder to assist in positioning the associated shoe end relative to the cylinder. 24 is a suitable abutment for the disk carried by the head of the adjacent piston. Both of the disks 23 are formed with peripheral notches which are engageable by a suitable tool, such as a screw driver, insertable through openings formed in the coverplate 25. The coil spring 26, extending between and connected to the upper end portions of the shoes 2 and 3 for retracting these end portions, is located to engage the notches in the disks to secure the same in their various positions of rotative adjustment.

The linkage 6 comprises the pairs of levers 27 and 28 floatingly mounted on and guided by the lower portion of the anchor plate 5, this lower portion being in the plane of the webs 11 of the shoes. The levers of each pair are on opposite sides of the anchorplate and the webs of the shoes and the pairs of levers are operatively connected to each other and to the shoes by means of the pivot pins 29 and 30 respectively. The pivot pin 29 extends freely through the opening 31 in the lower portion of the anchorplate and this opening is of a size such that the pivot pin at no time contacts its edge. 32 are slides pivotally connected to the intermediate portions of the pairs of levers by the pivot pins 33 with the axes of the pivot pins 33 in the planes of the pivot pins 29 and 30. The slides engage the upper and lower edges of the elongated openings 34 formed in the lower portion of the anchorplate and these openings extend horizontally and chordwise of the drum and have their upper and lower edges respectively in alignment or the same plane. The pairs of levers are inclined upwardly or diverge with respect to each other in a direction toward the actuator from their pivotal connection to each other to their pivotal connection to the shoes, so that upon operation of the levers as a result of energization of the actuator, the levers spread apart the lower end portions of the shoes.

For the purpose of returning the pairs of levers 27 and 28 to their normal or off position and centering the lower end portions of the brake shoes, I have provided the coil spring 35 normally engaging spaced shoulders on both the mounting plate and the pairs of levers below the pivot pin 29. The mounting plate is formed with the opening 36 in its lower portion below the pivot pin 29 providing the spaced vertical shoulders 37 normally abutted by the ends of the coil spring 35. The pairs of levers 27 and 28 have the depending projections 38 providing the spaced vertical shoulders 39 registering with the shoulders 37 in the retracted or off position of the levers and abutted by the ends of the coil spring 35. For retaining the coil spring 35 in place the mounting plate is formed with the projections 40 extending into the ends of the coil spring. The arrangement is such that the coil spring is compressed during the application of the brake and functions after the brake has been applied and upon relieving the pressure in the wheel cylinder to return the pairs of levers to their normal or off position in predetermined relation to the mounting plate.

In operation upon energization of the wheel cylinder by braking fluid under pressure, both of the pistons of the wheel cylinder are moved outwardly when the brake linings have a maximum thickness after having been worn in so that with the brake drum rotating in the direction of the arrow in Figure 1 the pivotal connection between the pair of levers 27 and the shoe 2 moves downwardly and laterally toward the vertical diametral line of the drum. This pair of levers moves bodily horizontally relative to the associated elongated opening 34 and at the same time angularly so that the pivotal connection between this pair of levers and the pair of levers 28 moves upwardly and away from the vertical diametral line of the drum toward the shoe 3. As a result the pair of levers 28 move bodily horizontally relative to their associated elongated opening 34 and also angularly so that the pivotal connection between this pair of levers and the shoe 3 moves upwardly and away from the vertical diametral line of the drum at a much smaller angle to the horizontal than the pivotal connection of the pair of levers 27 to the horizontal. Consequently, the lower ends of the shoes are spread apart. During the operation of the brake and as the brake linings wear, the piston of the wheel cylinder engageable with the shoe 3 has a progressively decreasing movement in applying the brake.

For applying the brake by cable there is the arcuate lever 41 between the web of the shoe 3 and the cover-plate 25, the lower end of the lever having provision for connection to the cable and the upper end of the lever being pivotally connected to the upper end portion of the shoe web by the pivot pin 42. There is also the link 43 extending between the upper end portions of the lever 41 and the shoe 2 and below the retracting coil spring 26, the ends of the link being notched at 44 and 45 to respectively embrace the lever and the web of the shoe. The lever is formed with the notch 46 and the shoe is formed with the opening 47 into which the ends of the link extend. As a result the link is held from accidental disengagement.

With this construction the radial expansion of the cast brake ring is substantially balanced on opposite sides of the axis of the drum so that the bearing for carrying the drum may have longer life. Furthermore, by reason of the substantial balance the back of the drum has but very small lateral deflections when the brake is applied.

What I claim as my invention is:

1. A brake comprising a brake drum, a pair of brake shoes engageable with said drum, an actuator between adjacent ends of said shoes and having relatively movable elements for urging said shoes against said drum, a plate, levers pivotally connected to each other and to said shoes, said levers diverging with respect to each other in a direction toward said actuator from their pivotal connection to each other to spread apart the portions of said shoes pivotally connected to said levers, guides on said plate extending at substantially a right angle to the diametral line extending between adjacent ends of said shoes and slides pivotally connected to said levers intermediate their pivotal connections to each other and to said shoes engaging and movable over said guides during the movement of said shoes against said drum.

2. A brake comprising a brake drum, a pair of brake shoes engageable with said drum, an actuator between adjacent ends of said shoes and having relatively movable elements for urging said shoes against said drum, a plate, levers pivotally connected to each other and also operatively connected to said shoes, said levers diverging with respect to each other in a direction towards said actuator from their pivotal connection to spread apart the portions of said shoes operatively connected to said levers, elements on said levers intermediate their pivotal connection and their operative connection to said shoes and elements on said plate extending at substantially a right angle to the diametral line extending through said drum midway between adjacent ends of said shoes, said lever elements being movable over said plate elements during movement of said shoes.

3. A brake comprising a brake drum, a pair of brake shoes engageable with said drum, an actuator between adjacent ends of said shoes and having relatively movable elements for urging said shoes against said drum, a plate, levers pivotally connected to each other and also operatively connected to said shoes, said levers diverging with respect to each other in a direction towards said actuator from their pivotal connection to spread apart the portions of said shoes operatively connected to said levers, elements on said levers intermediate their pivotal connection and their operative connection to said shoes and fixed elements on said plate extending in substantially the same plane, said lever elements being movable over said plate elements during movement of said shoes.

4. A brake comprising a brake drum, a pair of brake shoes engageable with said drum, a plate, an actuator mounted on said plate between adjacent ends of said shoes and having relatively movable elements for urging said shoes against said drum, levers pivotally connected to each other and also operatively connected to said shoes, said levers diverging with respect to each other in a direction toward said actuator from their pivotal connection to spread apart the portions of said shoes operatively connected to said levers, substantially aligned guides on said plate extending substantially chordwise of said drum and slides operatively connected to said levers intermediate their pivotal connection and their operative connection to said shoes, said slides being movable over said guides during the movement of said shoes against said drum.

5. A brake comprising a brake drum, a pair of brake shoes engageable with said drum, a plate having shoulder means, an actuator for said shoes operable to spread apart adjacent ends of said shoes, levers having adjacent ends operatively connected to each other and having their other ends operatively connected to said shoes remote from said adjacent ends operable by said actuator, means on said plate for guiding portions of said levers intermediate their ends and a single spring on said plate and normally engaging said shoulder means and said levers near their adjacent ends for retracting said levers and normally holding the same in predetermined relation to said plate.

6. A brake comprising a brake drum, brake shoes engageable with said drum, a plate having an opening providing spaced shoulders, an actuator for said shoes, levers pivotally connected to each other and operatively connected to said shoes, said levers being guided by said plate and responsive to engagement of one of said shoes with said drum by said actuator during rotation of said drum for moving the other of said shoes into engagement with said drum, said levers having spaced shoulders adjacent their pivotal connection normally registering with said spaced shoulders of said plate and a coil spring extending within the opening in said plate and normally engaging said spaced shoulders of both said plate and said levers to predeterminedly position said levers with respect to said plate.

ELMER R. ROSS.

REFERENCES CITED

The following references are of record in the file of this patent:

UNITED STATES PATENTS

| Number | Name | Date |
|---|---|---|
| 2,116,515 | Hawley | May 10, 1938 |

FOREIGN PATENTS

| Number | Country | Date |
|---|---|---|
| 37,395 | France | Nov. 29, 1930 |
| 320,709 | Great Britain | Oct. 24, 1929 |
| 627,476 | France | Oct. 5, 1927 |